United States Patent
Le Mellat

(10) Patent No.: US 8,064,866 B2
(45) Date of Patent: Nov. 22, 2011

(54) PASSIVE PROCESSING DEVICE FOR INTERFACING AND FOR ESD AND RADIO SIGNAL REJECTION IN AUDIO SIGNAL PATHS OF AN ELECTRONIC DEVICE

(75) Inventor: Bertrand Jean-Louis Le Mellat, Angers (FR)

(73) Assignee: NXP B.V., Eindhoven (NL)

(*) Notice: Subject to any disclaimer, the term of this patent is extended or adjusted under 35 U.S.C. 154(b) by 1051 days.

(21) Appl. No.: 11/629,715

(22) PCT Filed: Jun. 8, 2005

(86) PCT No.: PCT/IB2005/051874
§ 371 (c)(1),
(2), (4) Date: Nov. 5, 2007

(87) PCT Pub. No.: WO2005/125065
PCT Pub. Date: Dec. 29, 2005

(65) Prior Publication Data
US 2008/0181431 A1  Jul. 31, 2008

(30) Foreign Application Priority Data
Jun. 16, 2004  (EP) .................................. 04300380

(51) Int. Cl.
*H04B 1/10* (2006.01)
(52) U.S. Cl. ....... 455/312; 455/63.1; 455/307; 455/570; 455/114.2; 381/113
(58) Field of Classification Search .................... 381/55, 381/58, 59, 96, 94.1, 94.7, 94.8, 116, 120, 381/111–114, 28, 122, 394, 396, 386; 455/296, 307, 309–312, 114.2, 570, 63.1
See application file for complete search history.

(56) References Cited

U.S. PATENT DOCUMENTS

| | | | | |
|---|---|---|---|---|
| 4,491,689 A * | 1/1985 | Boeckman | .................... | 379/395 |
| 4,584,714 A * | 4/1986 | Fukuhara | ..................... | 455/297 |
| 5,940,520 A * | 8/1999 | Endo | ............................. | 381/111 |
| 6,507,659 B1 * | 1/2003 | Iredale et al. | ................... | 381/26 |
| 6,516,069 B1 * | 2/2003 | Takeuchi et al. | ............. | 381/122 |
| 6,928,174 B1 * | 8/2005 | Mantysalo et al. | ........... | 381/113 |
| 6,953,980 B2 * | 10/2005 | Escoffier et al. | .............. | 257/499 |
| 7,130,434 B1 * | 10/2006 | Grattan et al. | ............... | 381/113 |
| 7,224,949 B2 * | 5/2007 | Kluge et al. | .................. | 455/217 |
| 7,702,118 B2 * | 4/2010 | Park et al. | ..................... | 381/113 |
| 2003/0228848 A1 * | 12/2003 | Escoffier et al. | ................ | 455/91 |

FOREIGN PATENT DOCUMENTS
WO   WO 01/67811   9/2001

* cited by examiner

*Primary Examiner* — Edward Urban
*Assistant Examiner* — Rui Hu

(57) ABSTRACT

A passive processing device (D) is adapted to be interfaced in a full integrated way on at least a first audio signal path defined between a first audio signal source and an audio signal processing means of an electronic device, such as a mobile communication device. This device (D) comprises a first protection means (DE11; DE12) for rejecting electrostatic discharges on the first path, a first rejection means (CR11, R11; CR12) for rejecting radio signals at least in a chosen frequency band on the first path, and a first AC-coupling means (CC1) for interfacing voltage levels between the first audio signal source and the audio signal processing means.

14 Claims, 2 Drawing Sheets

US 8,064,866 B2

PASSIVE PROCESSING DEVICE FOR INTERFACING AND FOR ESD AND RADIO SIGNAL REJECTION IN AUDIO SIGNAL PATHS OF AN ELECTRONIC DEVICE

FIELD OF THE INVENTION

The present invention relates to audio signal processing in electronic devices such as mobile communication devices.

BACKGROUND OF THE INVENTION

As it is known by one skilled in the art, certain electronic devices, such as mobile communication devices, and notably mobile phones, have one or more audio signal amplification paths, such as microphone and audio accessory amplification paths that are subjected to a burst noise, which disturbs the audio signals. This burst noise mainly comes from the radio signals that are transmitted by the device antenna through bursts at different frequencies, such as 900 MHz and 1800 MHz (square-wave signal with Tcycle=4.615 ms Cyclic ratio ⅛ modulated by radio signal at a frequency of 900 MHz, for instance). This modulated signal is picked up by the microphone and/or audio accessory, but also by the conductive lines connecting the microphone and/or audio accessory connector to a baseband processor.

This burst noise is usually demodulated by the baseband processor's inner amplifiers and/or the microphone, which pollutes the audio signals to be transmitted.

For rejecting the burst noise one generally uses single or differential capacitor components (with chosen capacitances). These capacitor components are generally connected differentially between the two lines of each microphone path and single-ended between each line and a ground line, just before the baseband processor inputs but also just after the microphone outputs.

These capacitor components comprise packages that act as parasitic inductances and resistors, so that the capacitor components act as RLC serial cells. Now, the resonant frequencies of these RLC serial cells are approximately equal to the radio signal frequencies (900 MHz and 1800 MHz), so that they act as short-circuits.

Moreover, since the tracks where the components are soldered bring additional resistive (R) and inductance (L) components to their RLC model, new capacitance values must be computed for each capacitor component each time the layout of the mobile phone Printed Circuit Board (PCB) is modified, which is time-consuming and, therefore, expensive for mobile phone development. Moreover, the computed capacitance values may differ from the ones that are effectively adapted to the device, so that a lot of empiric tests are generally needed to get the required performance. The work and number of PCB-trials needed for tuning the burst noise immunity of microphone paths with discrete solution are one of the most, and sometimes the most, critical steps in terms of planning during a mobile phone development.

Moreover, when the amplification paths are protected against the burst noise, they usually need additional specific protection for the electrostatic discharges (ESD) and interface cells for AC-coupling and biasing purposes that are ensured by extra components.

Finally, these capacitor components, in addition to components needed for interfacing the microphones and the baseband component, such as AC-coupling capacitor for DC level adaptation, biasing resistor for biasing the microphones and Electro Static Discharge (ESD) protections, can occupy a substantial area on the board. This area occupancy prevents efficient layout of the PCB.

SUMMARY OF THE INVENTION

So, the object of this invention is to improve the situation.

For this purpose, it provides a passive processing device for at least a first audio signal path connecting a first audio signal source (for instance a microphone output) and an audio signal processing means (for instance a baseband processor input) of an electronic device, such as a mobile phone.

This passive processing device is characterized in that it is arranged to be interfaced on the first path in a fully integrated way between the first audio signal source and the audio signal processing means, and comprises i) a first protection means for rejecting electrostatic discharges (ESD) on the first path, ii) a first rejection means for rejecting radio signals at least in a chosen frequency band on the first path, and iii) a first AC-coupling means for interfacing voltage levels between the first audio signal source and the audio signal processing means.

Preferably the passive processing device also comprises a first biasing means for applying a chosen bias to the audio signals that are outputted by the first audio signal source on the first path.

The passive processing device according to the invention may have additional characteristics considered separately or combined, and notably:
- when the electronic device comprises a second audio signal path connecting a second audio signal source to the audio signal processing means, it may comprise a second protection means for rejecting ESD on the second path, a second rejection means for rejecting radio signals on the second path, and a second AC-coupling means for interfacing voltage levels between the second audio signal source and the audio signal processing means,
- the first and second audio signal source may be the first and second outputs of a microphone of the (mobile communication) device,
- it may comprise a second biasing means for applying a chosen bias to the audio signals that are outputted by the second audio signal source on the second path,
- the first biasing means may comprise a resistor connected to a bias control line and to a first conductive line connected to parts of the first path, and a set of two diodes connected in series in an opposite way to the bias control line and to a ground line and a capacitor connected in parallel to the set of diodes,
- the second biasing means may comprise a resistor connected to a ground line and to a second conductive line connected to parts of the second path,
- when the electronic device comprises a third audio signal path connecting a third audio signal source to the audio signal processing means, it may comprise a third protection means for rejecting ESD on the third path, a third rejection means for rejecting radio signals on the third path, and a third AC-coupling means for interfacing voltage levels between the third audio signal source and the audio signal processing means,
- when the t electronic device comprises a fourth audio signal path connecting a fourth audio signal source to the audio signal processing means, it may comprise a fourth protection means for rejecting ESD on the fourth path, a fourth means for rejecting radio signals on the fourth path, and a third AC-coupling means for interfacing voltage levels between the fourth audio signal source and the audio signal processing means, the third and fourth audio signal sources may be the first and second outputs of a connector for an audio accessory of the (mobile communication) device, the first and/or second and/or third and/or fourth AC-coupling means may each comprise a capacitor of a chosen capacitance mounted in series on first, second, third or fourth conductive lines connected to parts of the first, second, third and fourth paths, the first and/or second and/or third and/or fourth protection means may each comprise at least a first set of two diodes connected in series in an opposite way, and the first and/or second and/or third and/or fourth rejection means may each comprise at least a first capacitor and a first resistor. In this case each first set forms a first cell with one of the first capacitors in which they are connected in parallel to a ground line and to the first, second, third or fourth conductive line, and the first resistors are mounted in series on the first, second, third and fourth conductive lines, respectively, the first and/or second and/or third and/or fourth protection means may each comprise at least a second set of two diodes connected in series in an opposite way, and the first and/or second and/or third and/or fourth rejection means may each comprise at least a second capacitor. In this case, each second set forms a second cell with one of the second capacitors in which they are connected in parallel to the ground line and to the first, second, third or fourth conductive line, it may constitute a pluggable integrated circuit or box.

The invention also provides a mobile communication device comprising a passive processing device such as the one introduced above. Such a device may be a mobile phone, for instance.

BRIEF DESCRIPTION OF THE DRAWINGS

Other features and advantages of the invention will become apparent on examining the detailed specifications hereafter and the appended drawings, wherein.

The appended drawings may not only serve to complete the invention, but also contribute to its definition, if need be.

DESCRIPTION OF THE PREFERRED EMBODIMENTS

Figure 1:
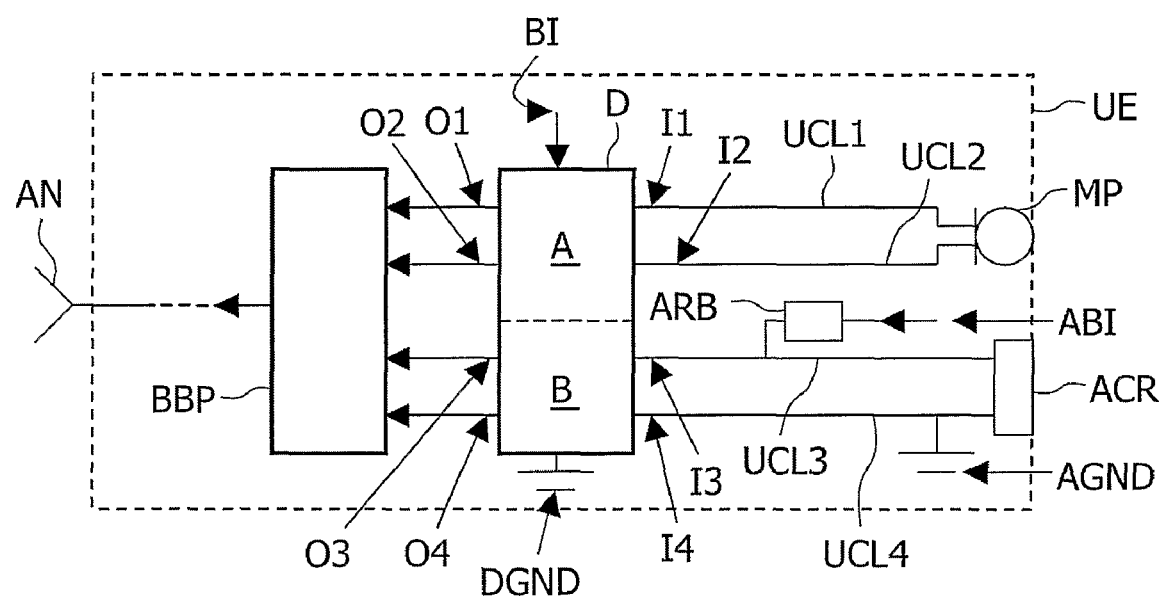
FIG. 1 schematically illustrates part of a mobile phone comprising a passive processing device according to the invention interfaced between a microphone and an audio connector, on one side, and a baseband processor, on the other, and FIG. 2 schematically illustrates an example of a passive processing device according to the invention.

Reference is initially made to FIG. 1 to describe an example of a mobile communication device UE in which the invention may be applied.

In the following description it will be considered that the device shown is a mobile phone UE, for instance a GSM/GPRS or UMTS mobile phone. But it is important to notice that the invention is not limited to this type of mobile communication device. Indeed this invention may be applied to any mobile communication device (such as a GSM card embedded in a computer) in which the audio signals picked up by a microphone and/or an audio accessory may be polluted by the radio signals transmitted by the antenna.

Moreover, the audio signal amplification paths being the only parts of the mobile phone UE to which the invention is applied, only these amplification paths will be focused on in the following description.

The illustrated mobile phone UE comprises schematically a microphone MP and an audio connector ACR, each having two outputs (positive and negative) arranged to feed two upstream conductive lines (UCL1, UCL2) and (UCL3, UCL4) respectively with picked-up audio signals, said upstream conductive lines being connected to four inputs I1 to I4 (among which I4 is connected to ground AGND) of a passive processing device D, itself having four outputs O1 to O4 feeding with processed, and notably amplified, audio signals a baseband processor BBP supporting amplifiers, but also a GSM coder/decoder that provides data to the RF stage for transmission by the antenna.

The audio connector ACR is adapted to receive a plug connected to an audio accessory of the mobile phone UE, such as an earphone or a hands-free car kit.

It is important to notice that the invention is not limited to four conductive lines and so to the process of audio signals on four audio paths. It also applies to a more or less considerable number of conductive lines. Indeed, the number of conductive lines depends on the number of microphones and audio connectors of the audio equipment but also on the number of outputs that each microphone MP or audio connector ACR has. Therefore, in a very simple embodiment the equipment may only comprise a single microphone with a single output connected to a single upstream conductive line UCL, itself connected to the single input of the passive processing device D. Moreover, the passive processing device D is preferably arranged to process the audio signals coming from the microphone MP and those coming from the audio connector ACR in an independent way. That is the reason why the device D is functionally divided in two independent parts A and B in FIGS. 1 and 2.

The four upstream conductive lines UCLi (I=1 to 4) and the baseband processor BBP define two parts of the first to fourth audio signal amplification paths.

The passive processing device D is fully integrated to be pluggable to the four upstream conductive lines UCLi (I=1 to 4) and to the baseband processor BBP, at least for radio signal rejection frequency, ESD protection and interfacing (or AC-coupling) purposes.

Figure 2:
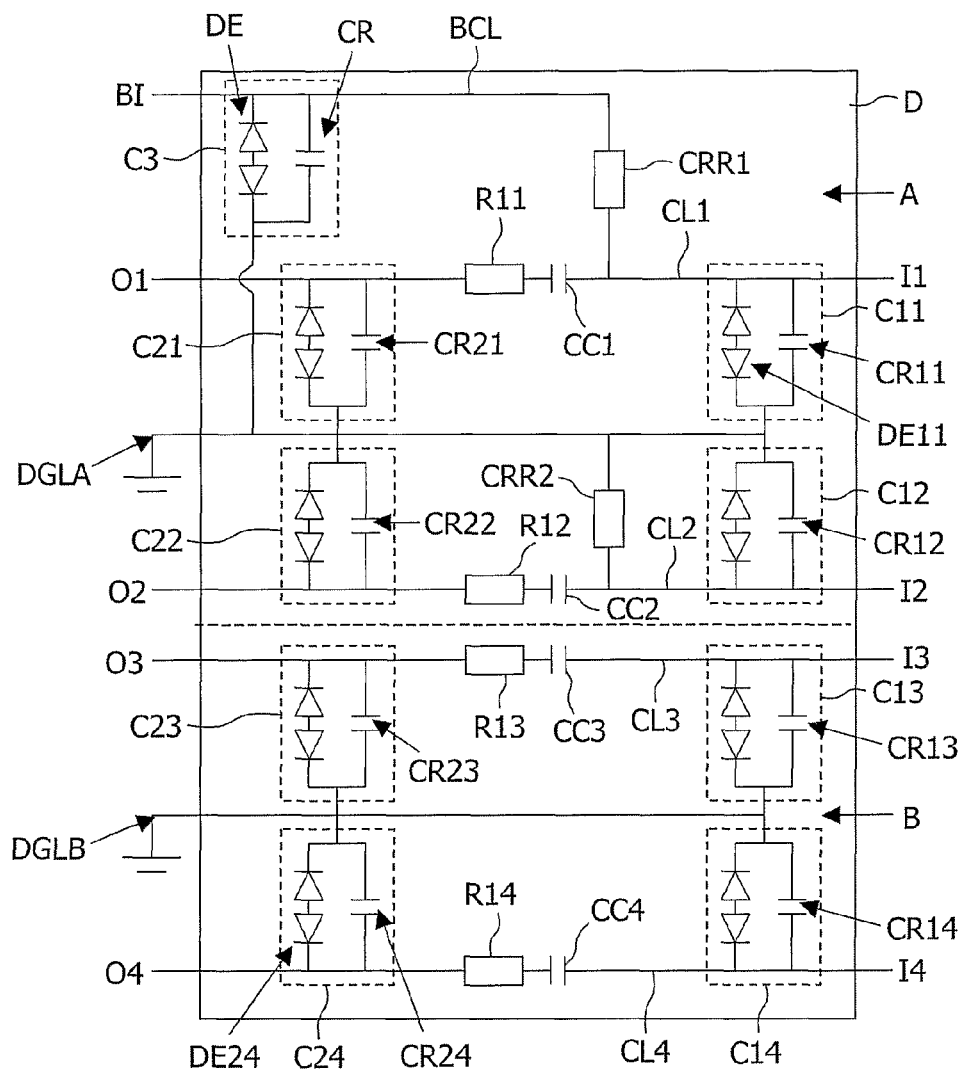

Preferably and as illustrated in FIG. 2, in a non-limiting example of embodiment, the passive processing device D is an integrated circuit realized in thin film-on-silicon technology.

According to the invention, the illustrated passive processing device D firstly has:

a first input I1 and a first output O1 connected to the opposite ends of a first conductive line CL1, a second input I2 and a second output O2 connected to the opposite ends of a second conductive line CL2, a third input I3 and a third output O3 connected to the opposite ends of a third conductive line CL3, a fourth input I4 and a fourth output O4 connected to the opposite ends of a fourth conductive line CL4, first DGLA and second DGLB ground lines connected to the device ground DGND.

In the example shown the outputs O1 and O2 deliver audio signals coming from the microphone MP and adapted to a first couple of positive and negative inputs respectively of the baseband processor BBP, while the outputs O3 and O4 deliver audio signals coming from the audio connector ACR and adapted to a second couple of positive and negative inputs respectively of the baseband processor BBP.

Each conductive line CL$i$ (I=1 to 4) comprises at least a first protection means DE1$i$ for rejecting the electrostatic discharges (ESD) that could appear on the corresponding audio path, a first rejection means for rejecting the radio signals having at least a chosen frequency on the corresponding audio path, and an AC-coupling means CC$i$ for interfacing the voltage levels between the audio signals delivered to the input I$i$ and the baseband processor BBP.

The AC-coupling means CC$i$ are all preferably the same on each conductive line CL$i$. But they could be different, notably in the two parts A and B of the passive processing device D, which process audio signals coming from different sources (microphone MP and audio connector ACR).

Each AC-coupling means CC$i$ preferably comprises a coupling capacitor. For instance the capacitance value of each capacitor CC$i$ varies between 5 nF and 100 nF.

Each first protection means DE1$i$ comprises preferably a first set of two diodes connected in series in an opposite way.

Each first rejection means preferably comprises a first capacitor CR1$i$ and a first resistor R1$i$ whose values are chosen and which are located at chosen places to reject the radio signals radiated by the antenna AN and picked up by the microphone MP and the upstream conductive line UCL$i$. In the described example of a GSM mobile phone UE the first rejection means are chosen to reject the radio signals having frequencies of at least 800 MHz, 950 MHz, 1800 MHz and 1900 MHz, and more typically from 80 MHz to 2 GHz.

Each first set of diodes DE1$i$ is connected in parallel to one of the first capacitors CR1$i$. A first set of diodes DE1$i$ and a first capacitor CR1$i$ together define a first cell C1$i$ which is connected to a conductive line CL$i$ and to one of the device ground lines DGLA or DGLB.

Each first cell C1$i$ is preferably connected to the conductive line CL$i$ in the vicinity of the corresponding input I$i$.

Each resistor R1$i$ is connected in series to one of the conductive lines CL$i$, and preferably downstream of the coupling capacitor CC$i$.

The resistance values of resistors R11 and R12, which receive the audio signals coming from the two microphone outputs, are preferably the same. For instance these resistance values are between 10Ω and 30 Ω.

The resistance values of resistors R13 and R14, which receive the audio signals coming from the two audio connector outputs, are also preferably the same. But they may be different from those of resistors R11 and R12. For instance these resistance values are between 1Ω and 10 Ω.

The capacitance values of capacitors CR11 and CR12 of cells C11 and C12, which receive the audio signals coming from the two microphone outputs, are preferably the same. For instance these capacitance values are between 50 pF and 100 pF.

The capacitance values of capacitors CR13 and CR14, which receive the audio signals coming from the two audio connector outputs, are also preferably the same. But they may be different from those of capacitors CR11 and CR12. For instance these capacitance values are included between 100 pF and 200 pF.

Preferably, each conductive line CL$i$ also comprises a second protection means DE2$i$ also for rejecting the electrostatic discharges (ESD) that could appear on it, and a second rejection means for rejecting the radio signals having at least a chosen frequency.

Each second rejection means comprises preferably a second capacitor CR2$i$.

Each second protection means DE2$i$ comprises preferably a second set of two diodes connected in series in an opposite way. Each second set of diodes DE2$i$ is connected in parallel to one of the second capacitors CR2$i$. A second set of diodes DE2$i$ and a second capacitor CR2$i$ together define a second cell C2$i$ which is connected to a conductive line CL$i$ and to one of the device ground lines DGLA or DGLB.

Each second cell C2$i$ is preferably connected to the conductive line CL$i$ in the vicinity of the corresponding output O$i$.

The first and second sets of diodes DE1$i$ and DE2$i$ are preferably the same.

Each second capacitor CR2$i$ works with the first resistor R1$i$ of the corresponding first rejection means for rejecting the radio signals radiated by the antenna AN and picked up by the conductive line CL$i$.

The capacitance values of capacitors CR21 and CR22 of cells C21 and C22, that receive the audio signals coming from the two microphone outputs, are preferably the same. For instance these capacitance values are between 0.1 nF and 0.5 nF.

The capacitance values of capacitors CR23 and CR24, that receive the audio signals coming from the two audio connector outputs, are also preferably the same. But they may be different from those of capacitors CR21 and CR22. For instance these capacitor values are between 0.2 nF and 0.6 nF.

When audio signals coming from a source (microphone MP or audio connector ACR) need to be biased, the passive processing device D may also comprise biasing means as illustrated in FIG. 2. This biasing means may apply a chosen bias to the audio signals that are outputted by at least one output of an audio signal source.

In the illustrated example the bias means is provided in part A to bias the audio signals delivered by the two microphone outputs. In such a case the bias means comprises first and second biasing means for applying chosen biases to the audio signals that are outputted by the first and second microphone outputs.

In the example shown the first biasing means comprises a resistor CRR1 that is connected to a bias control line BCL and to the first conductive line CL1, and a cell C3 of the type described above (comprising one set of diodes DE connected in parallel to a capacitor CR), connected to the bias control line BCL and to the first device ground line DGLA.

The bias control line BCL is connected to a bias input BI of the device D, which is itself connected to an integrated biasing module (not shown) of the mobile phone UE, for instance located inside the baseband processor BBP.

The cell C3 is preferably identical with cells C21 and C22.

For instance the resistance of the resistor CRR1 is between 1 kΩ and 3 kΩ.

The second biasing means only comprises a resistor CRR2 that is connected to the first device ground line DGLA and to the second conductive line CL2. On the second conductive line CL2 no biasing such as cell C3 is applied since on this conductive line (corresponding to the negative output of the microphone MP) the resistor CRR2 is connected to ground.

The resistance of the resistor CRR2 is preferably equal to the resistance of the resistor CRR1.

As illustrated in FIG. 1 the third and/or fourth upstream conductive lines may be coupled through an auxiliary resistor ARB to an auxiliary biasing input ABI, itself connected to an auxiliary biasing means of the mobile phone UE. Such an auxiliary biasing means may also be an integrated biasing module.

It is important to notice that the capacitors and the resistors may be classical capacitors or resistors, but they are preferably electronic components acting as capacitors or resistors.

Moreover, it is possible to add the biasing resistor of the third and fourth conductive lines as it is applied on the first and second conductive lines.

Thanks to the invention the frequency rejection does not depend on the equipment evolution (Printed Circuit Board modifications). So, a frequency band rejection performance may be warranty for different equipment layouts or configurations, which means that it is no more necessary to tune the equipment components.

Moreover the device being pluggable between the audio signal source and the baseband processor, the rejected frequency band does not depend on the length of the conductive lines required for connection to ground (contrarily to known solution with discrete capacitors).

More, three or four, functions (radio-frequency signal rejection, ESD protection, voltage level interfacing, and possibly audio signal biasing) being fully integrated in a single pluggable device made by a single die, this allows to save space on the board, and to avoid the use of additional components which could introduce additional noise on the audio path(s).

The invention is not limited to the embodiments of passive processing device (or circuit) and (mobile communication) equipment described above, only as examples, but it encompasses all alternative embodiments which may be considered by one skilled in the art within the scope of the claims hereafter.

Thus, the invention may also be used in other electronic devices without GSM application, but supporting microphone amplification path, in order to protect them against the mobile phone radiation. The disturbances provided by a GSM Mobile phone antenna are in effect often audible in audio outputs of electronic devices.

The invention claimed is:

1. A passive processing device for:
   a first audio signal path connecting a first audio signal source to an audio signal processing means of a device and a second audio signal path connecting a second audio signal source to said audio signal processing means, wherein the passive processing device is arranged to be interfaced on said first and second paths in a fully integrated way between said first and second audio signal sources and said audio signal processing means, respectively, wherein the passive processing device comprises:
   a first protection means for rejecting electrostatic discharges on said first path;
   a first rejection means for rejecting radio signals at least at a chosen frequency band on said first path; and
   a first AC-coupling means for interfacing voltage levels between said first audio signal source and said audio signal processing means;
   a second protection means for rejecting electrostatic discharges on said second path;
   a second rejection means for rejecting radio signals on said second path; and
   a second AC-coupling means for interfacing voltage levels between said second audio signal source and said audio signal processing means,
   wherein said first and second audio signal sources are positive and negative outputs of said device, respectively.

2. A passive processing device according to claim 1, further comprising a first biasing means for applying a chosen bias to the audio signals outputted by said first audio signal source on said first path.

3. A passive processing device according to claim 1, wherein said first and second audio signal sources are first and second outputs of a microphone of said device.

4. A passive processing device according to claim 1, further comprising a second biasing means for applying a chosen bias to the audio signals outputted by said second audio signal source on said second path.

5. A passive processing device according to claim 2, wherein said first biasing means comprises a resistor connected to a bias control line and to a first conductive line connected to parts of said first path and a set of two diodes connected in series in an opposite way to said bias control line and to a ground line and a capacitor connected in parallel to said diodes.

6. A passive processing device according to claim 1, wherein said second biasing means comprises a resistor connected to a ground line and to a second conductive line connected to parts of said second path.

7. A passive processing device according to claim 1, wherein the passive processing device is further configure for a third audio signal path connecting a third audio signal source to said audio signal processing means, wherein the passive processing device further comprises a third protection means for rejecting electrostatic discharges on said third path a third rejection means for rejecting radio signals on said third path and a third AC-coupling means for interfacing voltage levels between said third audio signal source and said audio signal processing means.

8. A passive processing device according to claim 1, wherein the passive processing device is further configure for a fourth audio signal path connecting a fourth audio signal source to said audio signal processing means, wherein the passive processing device further comprises a fourth protection means for rejecting electrostatic discharges on said fourth path a fourth rejection means for rejecting radio signals on said fourth path and a third AC-coupling means for interfacing voltage levels between said fourth audio signal source and said audio signal processing means.

9. A passive processing device according to claim 7, wherein said third and fourth audio signal sources are first and second outputs of a connector for an audio accessory of said device.

10. A passive processing device according to claim 1, wherein said first and/or second and/or third and/or fourth AC-coupling means each comprise a capacitor of a chosen capacitance mounted in series on first second third or fourth conductive lines connected to parts of said first second third and fourth paths.

11. A passive processing device according to claim 1, wherein said first and/or second and/or third and/or fourth protection means each comprise at least a first set of two diodes connected in series in an opposite way, in that said first and/or second and/or third and/or fourth rejection means each comprise at least a first capacitor and a first resistor each first set and each first capacitor being respectively connected in parallel to a ground line and to first, second, third and fourth conductive lines connected to parts of said first, second, third and fourth paths and forming a first cell and said first resistors being respectively mounted in series on said first, second, third and fourth conductive lines.

12. A passive processing device according to claim 11, wherein said first and/or second and/or third and/or fourth protection means each comprise at least a second set of two diodes connected in series in an opposite way, in that said first and/or second and/or third and/or fourth rejection means each comprise at least a second capacitor each second set and each second capacitor being connected in parallel to said ground line and to said first, second, third and fourth conductive lines respectively and forming a second cell.

13. A passive processing device according to claim 1, wherein the passive processing device constitutes a pluggable integrated circuit.

14. A mobile communication device comprising a passive processing device according to one of the preceding claims.

* * * * *